United States Patent
Zuzuly et al.

(10) Patent No.: US 7,308,383 B2
(45) Date of Patent: Dec. 11, 2007

(54) SYSTEM AND METHOD FOR PROVIDING ELECTRICAL SYSTEM MONITORING AND DIAGNOSIS

(75) Inventors: Daniel Zuzuly, Geneva, IL (US); Scott Mayhew, North Aurora, IL (US); Scott Wakefield, Plano, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 250 days.

(21) Appl. No.: 10/786,319

(22) Filed: Feb. 25, 2004

(65) Prior Publication Data

US 2005/0187738 A1    Aug. 25, 2005

(51) Int. Cl.
*G21C 17/00* (2006.01)

(52) U.S. Cl. .................. 702/183; 702/182; 702/60; 702/62; 318/727; 318/98; 361/23

(58) Field of Classification Search ............... 702/183, 702/105, 113, 60, 62, 57; 318/569, 600, 318/778, 782, 798, 801, 490, 727–729, 779, 318/799, 98; 361/23, 79, 86, 88
See application file for complete search history.

(56) References Cited

U.S. PATENT DOCUMENTS

| | | | | |
|---|---|---|---|---|
| 5,206,572 A | * | 4/1993 | Farag et al. ............... 318/778 |
| 5,543,698 A | * | 8/1996 | Tao et al. ................... 318/611 |
| 6,144,183 A | * | 11/2000 | Kawai ........................ 318/675 |
| 6,167,965 B1 | * | 1/2001 | Bearden et al. ......... 166/250.15 |
| 6,330,525 B1 | * | 12/2001 | Hays et al. ................. 702/183 |
| 6,894,452 B2 | * | 5/2005 | Mayhew et al. ............ 318/569 |
| 6,984,950 B2 | * | 1/2006 | Jonsson et al. ............. 318/440 |
| 2005/0105232 A1 | * | 5/2005 | Taylor ....................... 361/93.1 |

* cited by examiner

*Primary Examiner*—Michael P. Nghiem
*Assistant Examiner*—Hien Vo

(57) ABSTRACT

A soft starter system for monitoring and diagnosing electrical power system characteristics includes a motor controller including solid state switches for controlling application of power to a motor. A control circuit controls operation of the solid state switches. The control circuit includes a programmed processor for commanding operation of the solid state switches and for measuring electrical power system characteristics relating to operation of the solid state switches. A memory is connected to the programmed processor storing parameters of the measured electrical power system characteristics. An external monitoring and diagnostic device includes a memory for storing parameters of the measured electrical power system characteristics and an interface for communication with the motor controller. A monitoring and diagnostic program is operatively implemented in the external monitoring and diagnostic device for transferring parameters of the measured electrical power system characteristics from the control circuit to the external monitoring and diagnostic device to monitor electrical power system characteristics in real time.

27 Claims, 3 Drawing Sheets

SYSTEM AND METHOD FOR PROVIDING ELECTRICAL SYSTEM MONITORING AND DIAGNOSIS

CROSS REFERENCE TO RELATED PATENT APPLICATIONS

The present U.S. Patent Application having at least one common inventor as U.S. patent application Ser. No. 10/786,318 entitled "System and Method for Fault Contactor Detection", is now U.S. Pat. No. 7,130,170, and U.S. patent application Ser. No. 10/786,320 entitled "System and Method for Configuring A Soft Starter", (2004P02542US), and being filed with the U.S. Patent and Trademark Office concurrently on Feb. 25, 2004, the entirety of each is incorporated herein by reference.

FIELD OF THE INVENTION

This invention relates to a motor controller, such as a soft starter, and, more particularly, to a system and method for electrical system monitoring and diagnosis using a motor controller.

BACKGROUND OF THE INVENTION

Solid state starters/controllers have found widespread use for controlling application of power to an AC induction motor. The conventional starter/controller, referred to hereinafter as simply a controller, uses solid state switches for controlling application of AC line voltage to the motor. The switches may be thyristors such as silicon controlled rectifiers (SCRs) or triacs.

Conventional controllers include a housing enclosing the solid state switches and a control circuit for controlling operation of the solid state switches: For configuring controller operation the motor controller may include push button switches for setting parameter functions and ranges. Indicator lights, such as LEDs, may be used for status indication. While such a user interface may be adequate for configuring the motor controller and for monitoring, the user interface may not be considered user friendly to some end users. Particularly, selecting parameters to monitor may be time consuming and allows only a single parameter to be monitored.

One application for such a controller is as an elevator starter. The motor controller may be used to drive a pump for an hydraulic elevator. Each time movement of an elevator car is commanded, then the motor controller must start the elevator motor until it reaches operating speed and then operate in a run mode. Such a motor controller may only be used for the up direction as gravity may be used for the down direction. One type of elevator starter, referred to as a soft starter, changes the on time of the solid state switches to control voltage and to ramp up motor current with a fixed connection.

Occasionally, an elevator system may experience some problem with the power system, causing downtime for the elevator. The elevator service technician may go to the site but not see any problem at that specific time. To try to solve the problem, the technician may need to buy or rent expensive monitoring equipment to record power system values to analyze the problem.

The present invention is directed to improvements in monitoring and diagnosis of an electrical system.

SUMMARY OF THE INVENTION

In accordance with the invention, there is provided a system and method for providing electrical system monitoring and diagnosis.

Broadly, there is disclosed herein in accordance with one aspect of the invention a method of providing electrical system monitoring and diagnosis, comprising providing a motor controller including solid state switches for controlling the application of power to the motor, and a control circuit for controlling operation of the solid state switches and for measuring electrical power system characteristics relating to operation of the solid state switches; providing an external monitoring and diagnostic device; establishing communications between the control circuit and the external monitoring and diagnostic device; and periodically transferring parameters of the measured electrical power system characteristics from the control circuit to the external monitoring and diagnostic device to monitor electrical power system characteristics in real time.

It is a feature of the invention that providing a motor controller comprises providing a control circuit including a programmed processor for commanding operation of the solid state switches and a memory connected to the programmed processor for storing parameters of the measured electrical power system characteristics.

It is another feature of the invention that transferring parameters of the measured electrical power system characteristics comprises reading the stored parameters of the measured electrical power system characteristics from the memory.

It is another feature of the invention that providing an external monitoring and diagnostic device comprises providing a computer or personal digital assistant having a memory for storing the transferred parameters.

It is still another feature of the invention to print a list of the transferred parameters of the measured electrical power system characteristics.

It is still a further feature of the invention that the parameters are transferred at select time intervals.

It is yet an additional feature of the invention that the control circuit measures line voltage, motor voltage and motor current.

It is still another feature of the invention that establishing communications between the control circuit and the external monitoring and diagnostic device comprises providing an infrared communication path or a wired communication path between the control circuit and the external monitoring and diagnostic device.

There is disclosed in accordance with another aspect of the invention a motor controller system for monitoring and diagnosing electrical power system characteristics comprising a motor controller including solid state switches for controlling application of power to a motor and a control circuit for controlling operation of the solid state switches and for measuring electrical power system characteristics relating to operation of the solid state switches. An external monitoring and diagnostic device includes a memory for storing parameters of the measured electrical power system characteristics and an interface for communication with the motor controller. Means are operatively associated with the control circuit and the external monitoring and diagnostic device for transferring parameters of the measured electrical power system characteristics from the control circuit to the external monitoring and diagnostic device to monitor electrical power system characteristics in real time.

There is disclosed in accordance with yet another aspect of the invention a soft starter system for monitoring and diagnosing electrical power system characteristics comprising a motor controller including solid state switches for controlling application of power to a motor. A control circuit controls operation of the solid state switches. The control circuit comprises a programmed processor for commanding operation of the solid state switches and for measuring electrical power system characteristics relating to operation of the solid state switches. A memory is connected to the programmed processor storing parameters of the measured electrical power system characteristics. An external monitoring and diagnostic device includes a memory for storing parameters of the measured electrical power system characteristics and an interface for communication with the motor controller. A monitoring and diagnostic program is operatively implemented in the external monitoring and diagnostic device for transferring parameters of the measured electrical power system characteristics from the control circuit to the external monitoring and diagnostic device to monitor electrical power system characteristics in real time.

Further features and advantages of the invention will be readily apparent from the specification and from the drawings.

DETAILED DESCRIPTION OF THE INVENTION

Figure 1:
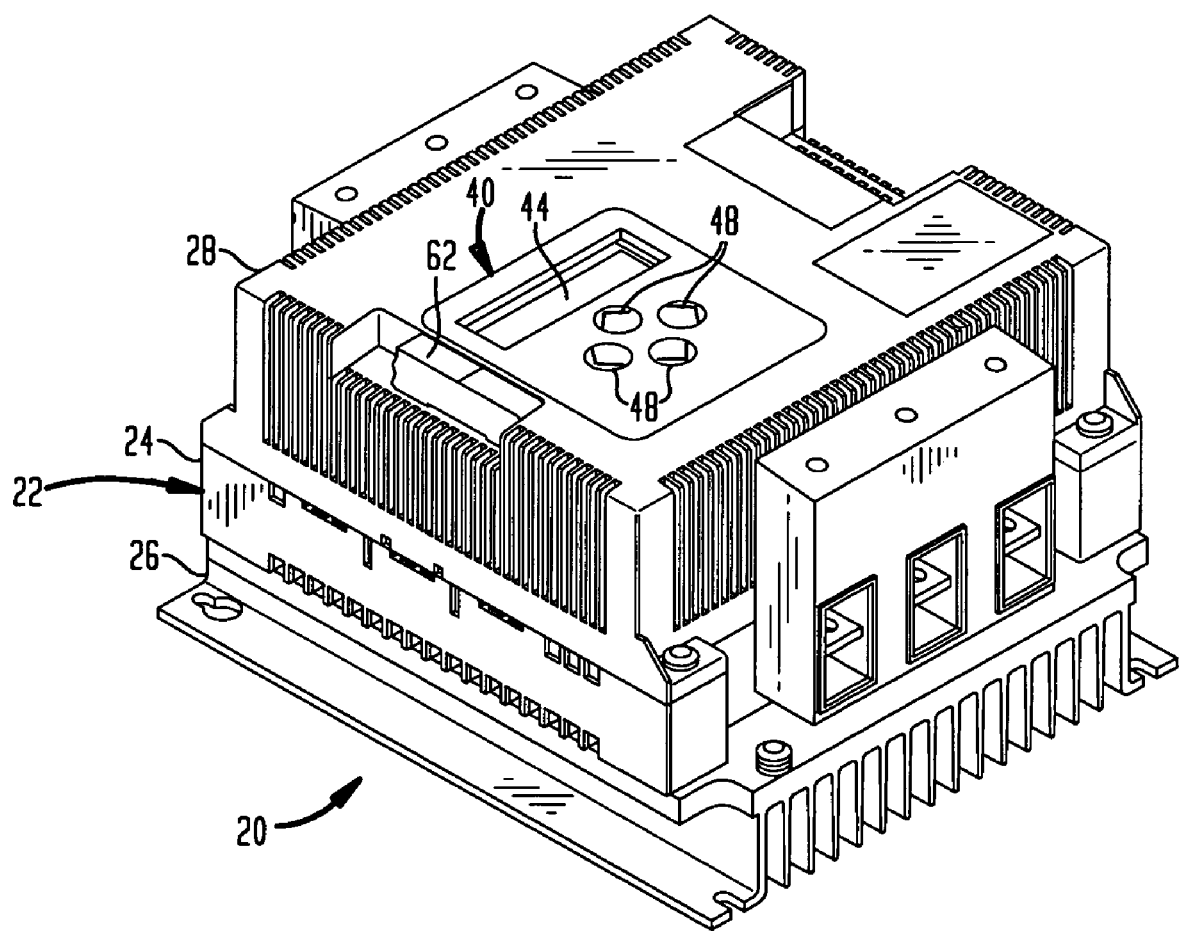
FIG. 1 is a perspective view of a motor controller in accordance with the invention.

Referring initially to FIG. 1, a solid state motor starter/controller 20, referred to hereinafter as simply a controller, in accordance with the invention is illustrated.

One application for the controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction. One type of elevator starter, referred to as a soft starter, changes the on time of the solid state switches to control voltage and to ramp up motor current with a fixed connection.

The motor controller 20 may be as generally described in pending application Ser. No. 10/252,326, assigned to the assignee of the present application, the specification of which is incorporated by reference herein. The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs are referred to as simply SCRs 32. Triacs could also be used. The SCRs 32 control application of three phase AC line power to a three phase motor. A different number of SCRs 32 could be used to control different numbers of phases, as is apparent to those skilled in the art.

Figure 2:
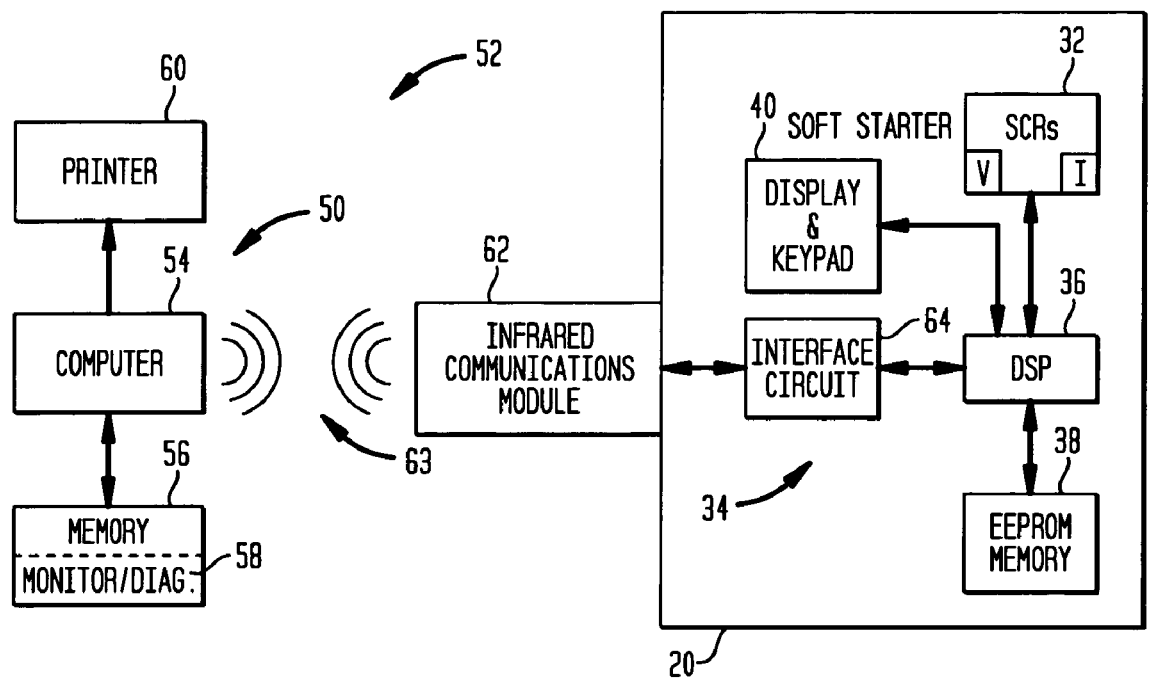
FIG. 2 is a block diagram of a wireless embodiment of a motor control monitoring and diagnostics system in accordance with the invention.

The SCRs 32 are mounted to the heat sink 26 within the housing 20. Referring also to FIG. 2, a control circuit 34 is also enclosed in the housing 20. The control circuit 34 controls operation of the SCRs 32 and monitors parameters such as line voltage, motor voltage and motor current by sensing SCR current from a current sensor I and voltage at either side of the SCRs 32 from a sensor V. Particularly, the control circuit 34 includes a programmed processor 36, such as a digital signal processor, operatively connected to the SCRs 32 for commanding operation of the SCRs 32 and measuring the power system values. A memory 38, such as an Eprom memory, is connected to the processor 36 and stores these and other parameters relating to motor operation and operation of the SCRs 32.

A display and keypad user interface 40, comprising an LCD display 44 and actuator elements, such as push buttons 48, on the cover 28, see FIG. 1, is connected to the processor 36. The display 44 is used to indicate configuration settings, operating values, fault conditions, and the like. User actuable switches (not shown) are electrically connected to the processor 36 and are actuated by the actuator elements 48. Particularly, the actuator elements 48 are used for manually selecting parameters for display.

In accordance with the invention, the motor controller 20 is adapted for communication with an external monitoring and diagnostic device 50 to define an electrical system monitoring and diagnostics system 52. The external monitoring and diagnostic device 50 comprises a computer 54. The computer 54 could be a conventional desktop computer, a laptop computer, or a personal digital assistant (PDA), or the like. In the illustrated embodiment of the invention, represented in FIG. 2, the computer 54 is adapted for wireless communication using infrared signaling or the like. For example, an infrared communication module is a standard element on commercially available PDAs. Similarly, wireless communication could be provided using currently available technologies such as Wi-Fi or Bluetooth.

The computer 54 is connected to a memory 56. The memory 56 could be internal memory of the computer 54 or removable media, as necessary or desired. The memory 56 stores a monitoring and diagnostic program 58 implemented by the computer 54 and data uploaded from the motor controller 20. A printer 60 may be connected to the computer 54 to print configuration information.

The computer 54 operates in accordance with various programs stored in the memory 56 and including the monitoring and diagnostics module 58 which transfers monitoring and diagnostics information from the motor controller 20.

In accordance with the invention, an infrared module 62 is mounted to the motor controller cover 28 and is electrically connected to the processor 36 via a conventional interface circuit 64. The infrared module 62 allows communications with the computer 54 via a wireless communication path 63. The infrared module 62 provides necessary voltage isolation with the computer 54.

Figure 3:
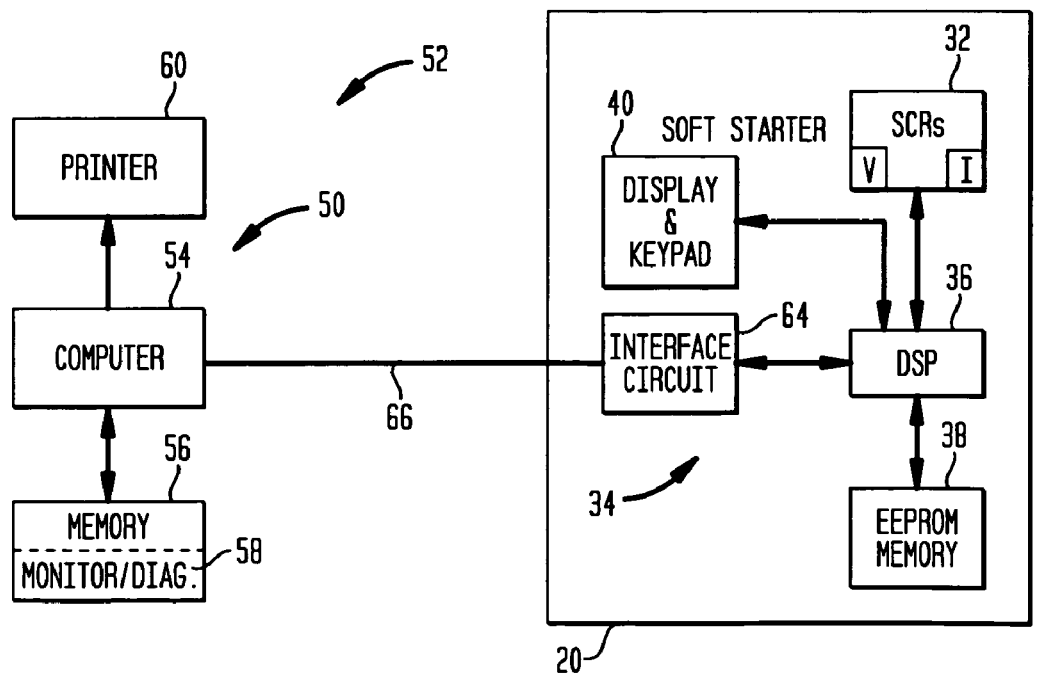
FIG. 3 is a block diagram of a wired embodiment of a motor control monitoring and diagnostics system in accordance with the invention.

Alternatively, and with reference to FIG. 3, the external device 50 could be hard wired using an electrically isolated serial cable 66 from the computer 54 to the interface circuit 64 for configuration. It should also be appreciated that the motor controller 20 could be configured or monitored from an external device over a network, such as the internet. As such, the cable 66 can represent the network or the external device 50 could be connected to the network in a conventional manner.

As discussed above, the motor controller 20 includes a local user interface in the form of the display and keypad 40 on the housing 22 for locally monitoring parameters stored in the memory 38. Additionally, external electrical system monitoring and diagnostics is provided in the form of the external monitoring and diagnostic device 50 for selectively uploading stored monitoring and diagnostics information.

As discussed above, the programmed processor 36 commands operation of the SCRs 32 and measures power system values such as voltage and current. More particularly, the processor 36 operates in accordance with conventional programs for commanding operation of the SCRs and uses various stored configuration parameters for determining the control sequence, such as during a soft start operation. The following table illustrates settings used by the programmed processor and parameters detected or determined by the programmed processor during normal operation:

TABLE 1

| Starter Sub-Menu Category | Parameter/Setting |
| --- | --- |
| Parameter Menu | Starting Amps |
|  | Overload Amps |
|  | Line Rotation |
|  | Off Delay mS. |
|  | On Delay mS. |
| OEM Menu | Starting Mode |
|  | Overload Mode |
|  | Amp Imbalance |
|  | Imbalance Enable |
|  | Low Amp UTS |
|  | Cycle Fault Contactor |
|  | Stall Detect |
|  | Stall Time |
|  | Start Limit Time |
| Engineering Menu | Prop Factor |
|  | Int Factor |
|  | Configuration |
|  | Motor Detection |
|  | Test Code |

These settings and real time parameters are stored in the control circuit memory 38. As is apparent, with a three phase motor, the various parameters will be measured or determined for each phase independently, as necessary, in a conventional manner. The present invention is not directed to any particular scheme for motor control or to monitoring any particular characteristics, but rather providing electrical system monitoring and diagnosis in real time using information transferred from the motor controller 20.

Figure 4:
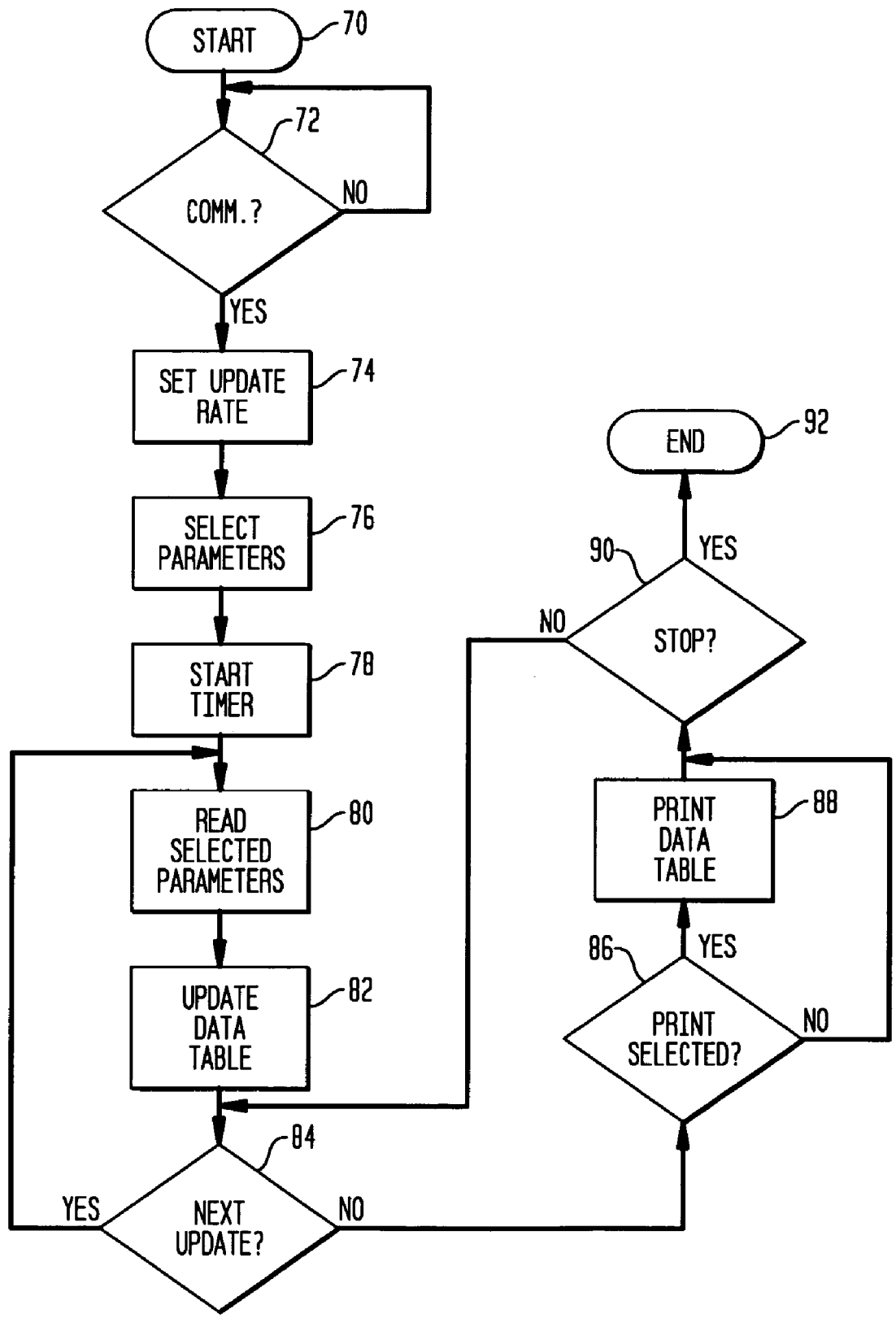
FIG. 4 is a flow diagram illustrating a monitoring and diagnostics module implemented by the system of FIGS. 2 and 3.

Referring to FIG. 4, a flow diagram illustrates the monitoring and diagnosis program implemented in the external monitoring and diagnostic device 50. The program begins at a start node 70. A decision block 72 determines if communications have been established with the motor controller 20 using either the wireless communication path 63 or the wired communication path 66. If not, the routine waits until communications are established. Thereafter, the user sets an update rate at a block 74. The update rate could be any desired rate such as once a second, ten times a second, one hundred times a second, as appropriate or as allowed by the appropriate communication path. One limitation on the rate would be the amount of memory 56 and the length of time for which monitoring and diagnosis is to be performed. The user then selects the parameters to be monitored at a block 76. The parameters could be any of the exemplary parameters noted above, or other parameters that are available in the motor controller memory 38. A start timer is then initiated at a block 78.

Thereafter, monitoring and diagnosing is performed beginning at a block 80 which reads the parameters selected at the block 76 as by transferring the selected parameters from the motor controller memory 38 to the external monitoring and diagnostic device memory 56. These read parameters are used to update a data table at a block 82. A decision block 84, using the update rate set at the block 74, determines if it is time for the next update. If so, then the program returns to the block 80. If not, a decision block 86 determines if the table is to be printed. If so, then the data table is printed at a block 88. Thereafter, or if printing is not selected, then a decision block 90 determines if the user has stopped monitoring and diagnosis. If so, then the routine ends at a node 92. If not, then the program returns to the decision block 84 to determine if it is time for the next update.

The following tables show examples of data tables that can be stored and printed with the external monitoring and diagnostic device 50.

TABLE 2

Feb. 20, 2004 08:36:26
Starting Amps = 148 Overload Amps = 42
Number of Starts = 31 Power Ups = 6

| PowerOnTime- | Status- | AmpA | AmpB | Amp D | Dly ms | Ovl % |
| --- | --- | --- | --- | --- | --- | --- |
| 0:37:36.2 | Start Ramp | 0 | 0 | 0 | 6.38 | 92.1 |
| 0:37:36.2 | Start Ramp | 22 | 25 | 27 | 6.18 | 92.1 |
| 0:37:36.2 | Start Ramp | 22 | 25 | 27 | 6.18 | 92.1 |
| 0:37:36.4 | Current Limit | 32 | 33 | 38 | 4.79 | 92.6 |
| 0:37:36.6 | Current Limit | 88 | 91 | 90 | 4.57 | 93.3 |
| 0:37:36.6 | Current Limit | 90 | 91 | 90 | 4.53 | 94.0 |
| 0:37:37.0 | Current Limit | 89 | 92 | 91 | 4.49 | 96.0 |
| 0:37:37.0 | Current Limit | 89 | 91 | 91 | 4.46 | 96.7 |
| 0:37:37.0 | Current Limit | 89 | 91 | 91 | 4.46 | 96.7 |
| 0:37:37.2 | Current Limit | 89 | 91 | 90 | 4.46 | 97.3 |
| 0:37:37.2 | Current Limit | 90 | 92 | 91 | 4.44 | 98.0 |
| 0:37:37.4 | Current Limit | 90 | 91 | 91 | 4.40 | 99.4 |
| Current Overload | | | | | | |
| 0:37:37.6 | Stopped | 62 | 36 | 69 | 6.50 | 100.0 |

TABLE 3

Feb. 20, 2004 08:36:18
Starting Amps = 148 Overload Amps = 42
Number of Starts = 29 Power Ups = 5

| PowerOnTime- | Status- | Amp A | Amp B | Amp D | Dly ms | Ovl % |
| --- | --- | --- | --- | --- | --- | --- |
| 0:37:30.8 | Start Ramp | 0 | 0 | 0 | 6.38 | 89.2 |
| 0:37:30.8 | Start Ramp | 22 | 24 | 24 | 6.30 | 89.2 |
| 0:37:31.0 | Current Limit | 39 | 42 | 43 | 5.04 | 89.4 |
| 0:37:31.2 | Current Limit | 88 | 91 | 89 | 4.58 | 90.0 |
| 0:37:31.4 | Current Limit | 90 | 92 | 90 | 4.43 | 91.4 |
| 0:37:31.6 | Current Limit | 89 | 91 | 89 | 4.30 | 92.7 |

TABLE 3-continued

Feb. 20, 2004 08:36:18
Starting Amps = 148 Overload Amps = 42
Number of Starts = 29 Power Ups = 5

| PowerOnTime- | Status- | Amp A | Amp B | Amp D | Dly ms | Ovl % |
|---|---|---|---|---|---|---|
| 0:37:31.8 | Current Limit | 73 | 69 | 72 | 0.85 | 93.5 |
| 0:37:32.0 | Upto Voltage | 21 | 17 | 18 | 0.00 | 93.4 |
| 0:37:32.2 | Upto Voltage | 20 | 16 | 17 | 0.00 | 93.3 |
| 0:37:32.4 | Upto Voltage | 20 | 16 | 17 | 0.00 | 93.2 |
| 0:37:32.6 | Upto Voltage | 20 | 16 | 17 | 0.00 | 93.2 |
| 0:37:32.8 | Upto Voltage | 13 | 10 | 18 | 0.00 | 93.0 |
| 0:37:33.0 | Upto Voltage | 14 | 14 | 37 | 0.00 | 93.0 |
| 0:37:33.2 | Upto Voltage | 15 | 15 | 36 | 0.00 | 92.9 |
| 0:37:33.4 | Upto Voltage | 15 | 15 | 35 | 0.00 | 92.9 |
| 0:37:33.6 | Upto Voltage | 15 | 15 | 37 | 0.00 | 92.8 |
| 0:37:33.8 | Upto Voltage | 15 | 15 | 35 | 0.00 | 92.7 |
| 0:37:34.0 | Upto Voltage | 15 | 14 | 37 | 0.00 | 92.7 |
| 0:37:34.2 | Upto Voltage | 15 | 15 | 36 | 0.00 | 92.6 |
| 0:37:34.4 | Upto Voltage | 15 | 14 | 37 | 0.00 | 92.5 |
| 0:37:34.6 | Upto Voltage | 15 | 15 | 37 | 0.00 | 92.4 |
| 0:37:34.8 | Upto Voltage | 15 | 15 | 37 | 0.00 | 92.4 |
| 0:37:35.0 | Upto Voltage | 15 | 15 | 39 | 0.00 | 92.3 |
| 0:37:35.2 | Upto Voltage | 20 | 20 | 55 | 0.00 | 92.3 |
| 0:37:35.4 | Upto Voltage | 23 | 23 | 65 | 0.00 | 92.5 |
| 0:37:35.6 | Upto Voltage | 25 | 25 | 70 | 0.00 | 92.5 |
| 0:37:35.6 | Stopped | 26 | 26 | 72 | 6.50 | 92.6 |

This monitored information can then be used by the technician to determine if there is an electrical system problem or some other type of problem.

It can therefore be appreciated that a new and novel system and method for electrical system monitoring and diagnosis in a motor controller, such as a soft starter has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

The invention claimed is:

1. A method of providing electrical system monitoring and diagnosis, comprising:
   providing a motor controller including solid state switches for controlling application of power to the motor, and a control circuit for controlling operation of the solid state switches and for measuring electrical power system characteristics relating to operation of the solid state switches;
   providing an external monitoring and diagnostic device;
   establishing communications between the control circuit and the external monitoring and diagnostic device; and
   periodically transferring parameters of the measured electrical power system characteristics from the control circuit to the external monitoring and diagnostic device to monitor electrical power system characteristics in real time.

2. The method of providing electrical system monitoring and diagnosis of claim 1 wherein providing a motor controller comprises providing a control circuit including a programmed processor for commanding operation of the solid state switches and a memory connected to the programmed processor for storing the parameters of the measured electrical power system characteristics.

3. The method of providing electrical system monitoring and diagnosis of claim 2 wherein transferring parameters of the measured electrical power system characteristics comprises reading the stored parameters of the measured electrical power system characteristics from the memory.

4. The method of providing electrical system monitoring and diagnosis device of claim 1 wherein providing an external monitoring and diagnostic device comprises providing a computer having a memory for storing the transferred parameters.

5. The method of providing electrical system monitoring and diagnosis of claim 1 wherein providing an external monitoring and diagnostic device comprises providing a personal digital assistant having a memory for storing the transferred parameters.

6. The method of providing electrical system monitoring and diagnosis of claim 1 further comprising printing a listing of the transferred parameters of the measured electrical power system characteristics.

7. The method of providing electrical system monitoring and diagnosis of claim 1 wherein periodically transferring parameters of the measured electrical power system characteristics comprises transferring the parameters at select time intervals.

8. The method of providing electrical system monitoring and diagnosis of claim 1 wherein the control circuit measures line voltage, motor voltage and motor current.

9. The method of providing electrical system monitoring and diagnosis of claim 1 wherein establishing communications between the control circuit and the external monitoring and diagnostic device comprises providing an infrared communication path between the control circuit and the external monitoring and diagnostic device.

10. The method of providing electrical system monitoring and diagnosis of claim 1 wherein establishing communications between the control circuit and the external monitoring and diagnostic device comprises providing a wired communication path between the control circuit and the external monitoring and diagnostic device.

11. A motor controller system for monitoring and diagnosing electrical power system characteristics, comprising:
   a motor controller including solid state switches for controlling application of power to a motor, and a control circuit for controlling operation of the solid state switches and for measuring electrical power system characteristics relating to operation of the solid state switches;
   an external monitoring and diagnostic device including a memory for storing parameters of the measured electrical power system characteristics and an interface for communication with the motor controller; and
   means operatively associated with the control circuit and the external monitoring and diagnostic device for transferring parameters of the measured electrical power system characteristics from the control circuit to the external monitoring and diagnostic device to monitor electrical power system characteristics in real time.

12. The motor controller system of claim 11 wherein the control circuit comprises a programmed processor for commanding operation of the solid state switches and a memory connected to the programmed processor for storing the parameters of the measured electrical power system characteristics.

13. The motor controller system of claim 12 wherein the transferring means comprises means for reading the stored parameters of the measured electrical power system characteristics from the memory.

14. The motor controller system of claim 11 wherein the external monitoring and diagnostic device comprises a computer having a memory for storing the transferred parameters.

15. The motor controller system of claim 11 wherein the external monitoring and diagnostic device comprises a personal digital assistant having a memory for storing the transferred parameters.

16. The motor controller system of claim 11 further comprising printer operatively associated with the external monitoring and diagnostic device for printing a listing of the transferred parameters of the measured electrical power system characteristics.

17. The motor controller system of claim 11 wherein the transferring means transfers the parameters at select time intervals.

18. The motor controller system of claim 11 wherein the control circuit measures line voltage, motor voltage and motor current.

19. The motor controller system of claim 11 wherein the transferring means comprises an infrared communication path between the control circuit and the external monitoring and diagnostic device.

20. The motor controller system of claim 11 wherein the transferring means comprises a wired communication path between the control circuit and the external monitoring and diagnostic device.

21. A soft starter system for monitoring and diagnosing electrical power system characteristics, comprising:
- a motor controller including solid state switches for controlling application of power to a motor, and a control circuit for controlling operation of the solid state switches, the control circuit comprising a programmed processor for commanding operation of the solid state switches and for measuring electrical power system characteristics relating to operation of the solid state switches, and a memory connected to the programmed processor storing parameters of the measured electrical power system characteristics;
- an external monitoring and diagnostic device including a memory for storing parameters of the measured electrical power system characteristics and an interface for communication with the motor controller; and
- a monitoring and diagnostic program operatively implemented in the external monitoring and diagnostic device for transferring parameters of the measured electrical power system characteristics from the control circuit to the external monitoring and diagnostic device to monitor electrical power system characteristics in real time.

22. The soft starter system of claim 21 wherein the external monitoring and diagnostic device comprises a computer having a memory for storing the transferred parameters.

23. The soft starter system of claim 21 wherein the external monitoring and diagnostic device comprises a personal digital assistant having a memory for storing the transferred parameters.

24. The soft starter system of claim 21 wherein the monitoring and diagnostic program is operable to upload the parameters from the controller memory to the external monitoring and diagnostic device memory.

25. The soft starter system of claim 21 wherein the control circuit measures line voltage, motor voltage and motor current.

26. The soft starter system of claim 21 wherein the interface comprises a wireless interface.

27. The soft starter system of claim 26 wherein the interface comprises a wired interface.

* * * * *